US008544610B2

(12) United States Patent
Paluncic et al.

(10) Patent No.: US 8,544,610 B2
(45) Date of Patent: Oct. 1, 2013

(54) LUBRICANT DISPENSER

(75) Inventors: Zdravko Paluncic, Ludwigshafen (DE); Andreas Schoenfeld, St. Leon-Rot (DE)

(73) Assignee: Lincoln GmbH, Walldorf (DE)

(*) Notice: Subject to any disclaimer, the term of this patent is extended or adjusted under 35 U.S.C. 154(b) by 114 days.

(21) Appl. No.: 12/745,429

(22) PCT Filed: Oct. 9, 2008

(86) PCT No.: PCT/EP2008/008514
§ 371 (c)(1),
(2), (4) Date: Sep. 21, 2010

(87) PCT Pub. No.: WO2009/068135
PCT Pub. Date: Jun. 4, 2009

(65) Prior Publication Data
US 2011/0005866 A1    Jan. 13, 2011

(30) Foreign Application Priority Data
Nov. 29, 2007   (DE) ............... 20 2007 016 788 U

(51) Int. Cl.
*F16N 11/08* (2006.01)
(52) U.S. Cl.
USPC .......................................................... 184/26
(58) Field of Classification Search
USPC ............................... 184/26, 36, 67
See application file for complete search history.

(56) References Cited

U.S. PATENT DOCUMENTS

| | | | |
|---|---|---|---|
| 3,595,340 A * | 7/1971 | Obergefell et al. ............ | 184/28 |
| 3,912,045 A | 10/1975 | Morris | |
| 4,754,848 A * | 7/1988 | Azzopardi et al. ........... | 184/6.26 |
| 5,271,528 A * | 12/1993 | Chien .............................. | 222/63 |
| 5,632,355 A * | 5/1997 | Dussault ....................... | 184/7.4 |
| 5,634,531 A | 6/1997 | Graf | |
| 6,244,387 B1 * | 6/2001 | Paluncic et al. ................ | 184/37 |
| 6,354,816 B1 | 3/2002 | Yang | |
| 6,695,590 B1 | 2/2004 | Rydin | |

(Continued)

FOREIGN PATENT DOCUMENTS

| | | |
|---|---|---|
| DE | 4422407 C2 | 1/1996 |
| DE | 10 2004 061 447 A1 | 6/2006 |

(Continued)

OTHER PUBLICATIONS

Fletcher M., Oil Delivery System Gives Bearings the Slip, 2 pgs.

(Continued)

*Primary Examiner* — William E Dondero
*Assistant Examiner* — Mark K Buse
(74) *Attorney, Agent, or Firm* — Senniger Powers LLP

(57) ABSTRACT

The invention relates to a lubricant dispenser having a storage container, an outlet channel, and a pump element disposed between the storage container and outlet channel for conveying lubricant. A piston is sealed in a cylinder and is movable between two positions, of which, in a suction position, the cylinder is in a flow connection with the storage container. The cross-section area of the piston is smaller than the cross-section area of the storage container. The piston and the cylinder are adapted to one another such that, upon a movement of the piston into the suction position thereof, a negative pressure may be generated in the cylinder as compared to the pressure in the storage container for taking in or letting in lubricant from the storage container into the cylinder, and such that, upon a movement of the piston in the opposite direction out of the suction position in the cylinder, a positive pressure may be generated for conveying the lubricant out of the cylinder into the outlet channel.

17 Claims, 4 Drawing Sheets

(56) References Cited

U.S. PATENT DOCUMENTS

| | | | |
|---|---|---|---|
| 7,059,450 B2 * | 6/2006 | O'Toole et al. | 184/105.1 |
| 2004/0003969 A1 * | 1/2004 | O'Toole et al. | 184/26 |
| 2004/0129500 A1 | 7/2004 | Weigand | |
| 2005/0163626 A1 * | 7/2005 | Paluncic | 417/244 |

FOREIGN PATENT DOCUMENTS

| | | | |
|---|---|---|---|
| EP | 1 226 385 | B1 | 1/2005 |
| EP | 1104867 | B1 | 6/2006 |
| EP | 1418379 | B1 | 9/2006 |
| WO | 03106598 | A2 | 12/2003 |

OTHER PUBLICATIONS

International Search Report regarding PCT/EP2008/008514, mailed Dec. 18, 2008, 7 pages.

International Preliminary Report on Patentability regarding PCT/EP2008/008514 mailed Jul. 15, 2010, 16 pages.

* cited by examiner

LUBRICANT DISPENSER

FIELD OF THE INVENTION

The invention pertains to a lubricant dispenser with a reservoir and an outlet channel, wherein lubricant can be conveyed out of the lubricant dispenser by means of a piston.

BACKGROUND OF THE INVENTION

Lubricant dispensers of this type are used, for example, for lubricating machines or machine components in order to lubricate lubricating points according to requirements. Such a lubricant dispenser is known, for example, from DE 44 22 407 C2, in which it is proposed to accommodate a piston driven by an electric motor in the essentially cylindrical reservoir in order to move the piston that extends over the entire cross section of the reservoir in the direction of the outlet, and to thusly press lubricant out of the reservoir. In this case, the motor consists of a conventional electric motor. This motor furthermore features a travel control that is provided with angle switches in order to precisely meter a lubricant quantity.

Another lubricant dispenser for lubricating several lubricating points is known from EP 1 418 379 B1, wherein a distributing device provided at a lubricant outlet is rotationally driven by a conventional electric motor and releases different outlets in dependence on the rotational position of a distributing sleeve provided with openings.

SUMMARY OF THE INVENTION

The present invention is based on the objective of improving the operating performance of a lubricant dispenser and to realize, in particular, a simple design thereof.

According to the invention, this objective is attained with a lubricant dispenser with the characteristics of Claim 1. Advantageous embodiments and additional developments are disclosed in the respective dependent claims.

An inventive lubricant dispenser comprises, for example, a cylindrical reservoir and an outlet channel, as well as a pump element for conveying lubricant that is arranged between the reservoir and the outlet channel, and features a piston that is sealed and guided in a cylinder such that it can be displaced between two positions, with the cylinder being fluidically connected to the reservoir in an intake position, and with the cross-sectional surface of the piston being smaller than the cross-sectional surface of the reservoir, wherein the piston and the cylinder are adapted to one another in such a way that a negative pressure in comparison with the pressure in the reservoir can be generated in the cylinder during a movement of the piston into its intake position in order to draw or admit lubricant from the reservoir into the cylinder, and wherein a positive pressure can be generated in the cylinder during an opposite movement of the piston out of its intake position in order to convey lubricant out of the cylinder and into the outlet channel.

If a connecting conduit with correspondingly small dimensions or a piston cross section with small dimensions is provided, this preferably makes it possible to generate a higher pressure than with the state of the art at the same motor power. It is advantageous that this also allows a highly precise metering of the lubricant. Since only a low motor power is required, the driving motor can also have smaller dimensions. Last but not least, such an inventive arrangement preferably makes it possible to quickly exchange an empty reservoir without having to exchange or dismount the entire lubricant dispenser.

The lubricant dispenser is designed, in particular, for lubricants such as lubricating oils, lubricating greases or the like. However, the invention is not limited to a lubricant dispenser, but rather may also concern a hydraulic fluid dispenser or the like.

The reservoir is realized, for example, in the form of a cartridge, wherein the reservoir may also consist of a tank or the like that has, in particular, an irregular design. The reservoir may consist, in particular, of a bag that can be connected to the connecting conduit. The reservoir preferably can be separated from the lubricant dispenser, but may also be integrated into the lubricant dispenser. The reservoir can be connected to the lubricant dispenser, for example, by means of a screw connection. The reservoir may advantageously consist of a disposable reservoir that is replaced with a new reservoir after it has been depleted.

The connecting conduit may simply be realized, for example, in the form of a tube. However, it would also be possible to use a hose or a cavity that is realized in the form of a conduit in a block of material.

The cylinder is realized, for example, in the form of a section of the connecting conduit. The cylinder and/or the connecting conduit preferably have/has a circular cross section. However, they/it may also be realized in a square, rectangular, polygonal or generally irregular fashion.

The cross section of the piston is realized, in particular, complementary to the cross section of the cylinder. The piston is preferably arranged in the cylinder with a clearance fit such that it can be easily displaced within the cylinder.

The cylinder may, for example, have an enlarged cross section on a head side that faces the reservoir such that a fluidic connection is released when a lower edge of the displaceable piston is displaced as far as into this head region.

The arrangement is sealed, in particular, as long as the piston is situated in the cylinder. In this case, a fluidic connection is produced by completely displacing the piston into the reservoir. It is advantageous that the piston simultaneously fulfills the function of a valve in this case.

According to an additional development of the lubricant dispenser, a check valve provided between the cylinder and the reservoir is prestressed in the direction of its closed position, in which it blocks lubricant from flowing out of the reservoir. This makes it possible to prevent undesired emptying or leaking of the reservoir. In this case, the check valve is realized, for example, in the form of a spring-loaded ball that is pressed against a valve seat in the direction of the reservoir outlet. If the check valve is integrated into the reservoir and arranged at the reservoir outlet, it is preferably possible to realize a simple modular design of the lubricant dispenser, in which the reservoir in the form of an exchangeable cartridge or the like can be easily installed and replaced.

The drawing or admitting of lubricant into the cylinder can be controlled by providing a check valve that can be opened by the piston at least in its intake position between the cylinder and the reservoir. An influence of the pressure in the reservoir on a lubricating process can be advantageously eliminated if the first check valve is closed as long as the piston is not situated in the intake position. It is possible, in particular, to adjust a pressure for a lubricating process independently of the pressure in the reservoir. This preferably allows a simplified control.

Alternatively or additionally, a check valve may be provided between the cylinder and the outlet channel or in the outlet channel, particularly between the cylinder and an outlet opening of the lubricant dispenser, wherein said check valve can be opened by the positive pressure generated in the cylinder during a movement of the piston out of its intake position. Uncontrolled emptying or leaking of the lubricant dispenser preferably is prevented in this fashion. The opening pressure of this check valve is preferably adjusted in such a way that it does not open until the desired lubricating pressure is reached.

According to one embodiment of the lubricant dispenser (FIG. 1A), the cylinder features a bypass section comprising a recess 7a at a side surface of the piston 7, in which the piston is situated in its intake position, wherein the bypass section is realized in such a way that lubricant can flow past the piston from its side that faces the reservoir to its side that faces the outlet channel in the intake position of the piston. The lubricant may also flow through a bypass that is released in the intake position of the piston. For example, the bypass leads from the reservoir into the cylinder through an opening provided in a region of the cylinder that lies opposite of the intake position of the piston such that the opening is released when the piston is displaced into the intake position and otherwise closed.

A simple constructive design is preferably achieved if the piston is realized in the form of a thickened section of a piston rod. The piston rod and the piston may be realized in one piece or in several pieces. In this case, the piston may form an end of the piston rod, but the piston rod may also protrude over the piston. This is realized, for example, if the check valve should be actuated by the piston rod and the piston simultaneously seals the cylinder section and therefore the connecting conduit at least in a section of the travel provided for opening the valve.

A controlled metering and/or a controlled pressure build-up is preferably improved if a stepping motor is provided for driving the piston. The connection to a stepping motor preferably makes it possible to forego sensors that might otherwise be required for precisely adjusting a travel or a quantity of lubricant to be pressed out. Since the stepping motor has a higher holding torque than a conventional electric motor, it preferably also makes it possible to use the piston as a valve without requiring additional check valves.

According to an additional development, the stepping motor features an axially displaceable drive axle, wherein the stepping motor is preferably arranged in such a way that the direction of displacement of the drive axle extends parallel to and preferably in alignment with the moving direction of the piston. In this case, the piston rod or the piston may actuate the check valve in the form of a tappet.

According to one embodiment, the drive axle preferably is positively and/or non-positively connected to the piston rod. The drive axle and the piston rod may, in particular, be realized in one piece. This advantageously makes it possible to eliminate a possibly required gear.

According to one variation of the lubricant dispenser, the reservoir is subjected to pressure by means of at least one spring element, particularly a spring-loaded pressure piston. For example, a flat coil spring, a pneumatic spring or the like is provided as spring element. This preferably makes it possible to safely and completely empty the reservoir. In this case, it is not necessary, in particular, to actively draw lubricant into the cylinder by means of a negative pressure generated in the cylinder by means of the piston. This is advantageous, for example, with respect to highly viscous lubricants.

Particularly with respect to low-viscosity lubricants, however, it may be advantageous to eliminate such a spring element if the lubricant is drawn into the cylinder when the connecting conduit is opened due to the negative pressure in the cylinder, and the reservoir is hermetically sealed such that the reservoir can either be deformed by the air pressure or its volume can be reduced by displacing a corresponding piston.

In one simple embodiment, the reservoir consists, for example, of an air-tight bag, particularly a plastic bag, that can be compressed by the air pressure until it is completely empty.

According to an additional development, the lubricant dispenser is designed in such a way that the outlet channel features an outlet that is realized, for example, in the form of a connection, wherein the pressure of the lubricant at the outlet amounts to more than 5 bar, particularly more than 10 bar, preferably more than 50 bar, during a movement of the piston out of its intake position. This preferably also allows lubrication under high pressure and/or the transport of the lubricant through long conduits, in which a high pressure loss occurs. Such pressures can be achieved, for example, with a piston of suitable dimensions, wherein said piston can, in contrast to the state of the art, basically be realized arbitrarily small because the travel of the piston during the lubricating process is advantageously not limited to a length of the piston rod and/or the reservoir. On the contrary, the lubricant can be dispensed in several cycles, in which the piston is alternately moved back and forward between the intake position and the other position.

The invention furthermore pertains to a lubricant dispenser, particularly according to one of the above-described embodiments, in which at least one distributing element is provided that can be connected to the outlet channel in order to distribute the lubricant over at least two subconduits and in which the distributing element features at least one control element for opening and closing at least one of the subconduits, wherein a stepping motor is assigned to and drives the control element. This distributing element preferably allows the distribution of the lubricant to several lubricating points with a single lubricant dispenser. For example, a single lubricant dispenser may be provided on a machine in order to distribute the lubricant to all lubricating points of the machine by means of the distributing element. The control element preferably makes it possible to separately open and close each of the subconduits. However, the control element may also be designed in such a way that the subconduits are opened or closed in groups. The control element is realized, in particular, in the form of a mechanical actuator. The utilization of the stepping motor preferably makes it possible to eliminate possibly required sensors for determining the current angle or rotational position. It would be possible, in particular, to realize the rotation with the stepping motor of the lubricant dispenser provided for pressing out the lubricant, wherein a corresponding clutch is provided for this purpose.

According to one embodiment of the lubricant dispenser, the distributing element features a cylindrical distributing sleeve with circumferentially arranged connection openings for connecting the subconduits, as well as the control element that is realized in the form of a hollow cylindrical sleeve and accommodated in the distributing sleeve in a rotatably supported and sealed fashion, wherein the interior of the hollow control element is fluidically connected to the outlet channel, and wherein distribution bores are circumferentially arranged in the control element in such a way that at least one distribution bore can be connected to at least one of the connection openings in dependence on the relative rotational position of the control element in the distributing sleeve in order to produce a fluidic connection between the outlet channel and one of the subconduits. In one simple embodiment, for example, the connection openings are arranged on the distributing sleeve equidistantly and mutually aligned equiangularly. The distribution bores of the cylindrical sleeve may be accordingly realized in such a way that a number of distribution bores that is identical to the number of connection bores can be arranged congruently therewith in one rotational position. This makes it possible, for example, to simultaneously open or close all subconduits. However, it would also be possible to offset the holes of the distribution bores that are respectively assigned to the connection openings by a certain angle. It would furthermore be possible that the respective holes extend over a certain angular range such that, e.g., several conduits can be opened or closed while a third conduit remains opened.

According to one variation, the distribution bores are arranged relative to the connection openings in such a way that a fluidic connection between a distribution bore and one of the connection openings results in the remaining distribution bores not being fluidically connected to one of the connection openings.

A flexible applicability of the distributing element is preferably achieved if the distributing element is accommodated in a separate housing that can be connected to a housing of the lubricant dispenser that accommodates the reservoir and/or the cylinder with the piston. For example, the distributing element can be screwed on the outlet channel of the lubricant dispenser. However, it would also be possible to provide a snap-on connection or a clamping connection or the like. It would also be possible, in particular, to screw together the respective housings of the lubricant dispenser and the distributing element.

The invention furthermore pertains to a method for actuating a lubricant dispenser, particularly according to one of the above-described embodiments, wherein a displaceable piston is displaced into an intake position in a cylinder such that a fluidic connection between a pressurized reservoir with larger cross section than the piston and the cylinder is opened and lubricant flows into the cylinder, and wherein the piston is subsequently displaced opposite to the intake position such that the piston displaces lubricant from the cylinder into an outlet channel.

In this case, it is proposed, in particular, that the piston opens a first check valve that closes the reservoir against the restoring force of said check valve when it is displaced in the first axial direction.

According to an additional development, a negative pressure is generated on the rear side of the piston referred to the direction of displacement when the piston is displaced into the intake position such that lubricant is drawn from the reservoir and into the cylinder when the fluidic connection, particularly the first check valve, is opened. A check valve is provided, in particular, in the outlet channel of the lubricant dispenser in order to generate the negative pressure. Depending on the dimensions of the outlet channel cross section and the respective lubricant or its viscosity, respectively, it would also be possible to forego such a valve. Due to the friction of the lubricant being adjusted in the outlet channel, the lubricant is prevented from being drawn back into the cylinder during a movement of the piston into the intake position such that a negative pressure can be generated in the cylinder. Lubricant is drawn from the reservoir and into the cylinder when the piston is moved so far in the direction of the intake position that the fluidic connection is opened, wherein this is the case, e.g., when the piston emerges from the cylinder or completely penetrates into a section of the cylinder with a widened cross section.

The invention is described in an exemplary fashion below with reference to the drawings. However, the invention is not limited to the combinations of characteristics illustrated in these drawings. On the contrary, characteristics disclosed in the description and/or the figures may be essential to the invention individually or in combination regardless of the reference of the claims.

BRIEF DESCRIPTION OF THE DRAWINGS

The drawings schematically show.

DETAILED DESCRIPTION

Figures 1, 2:
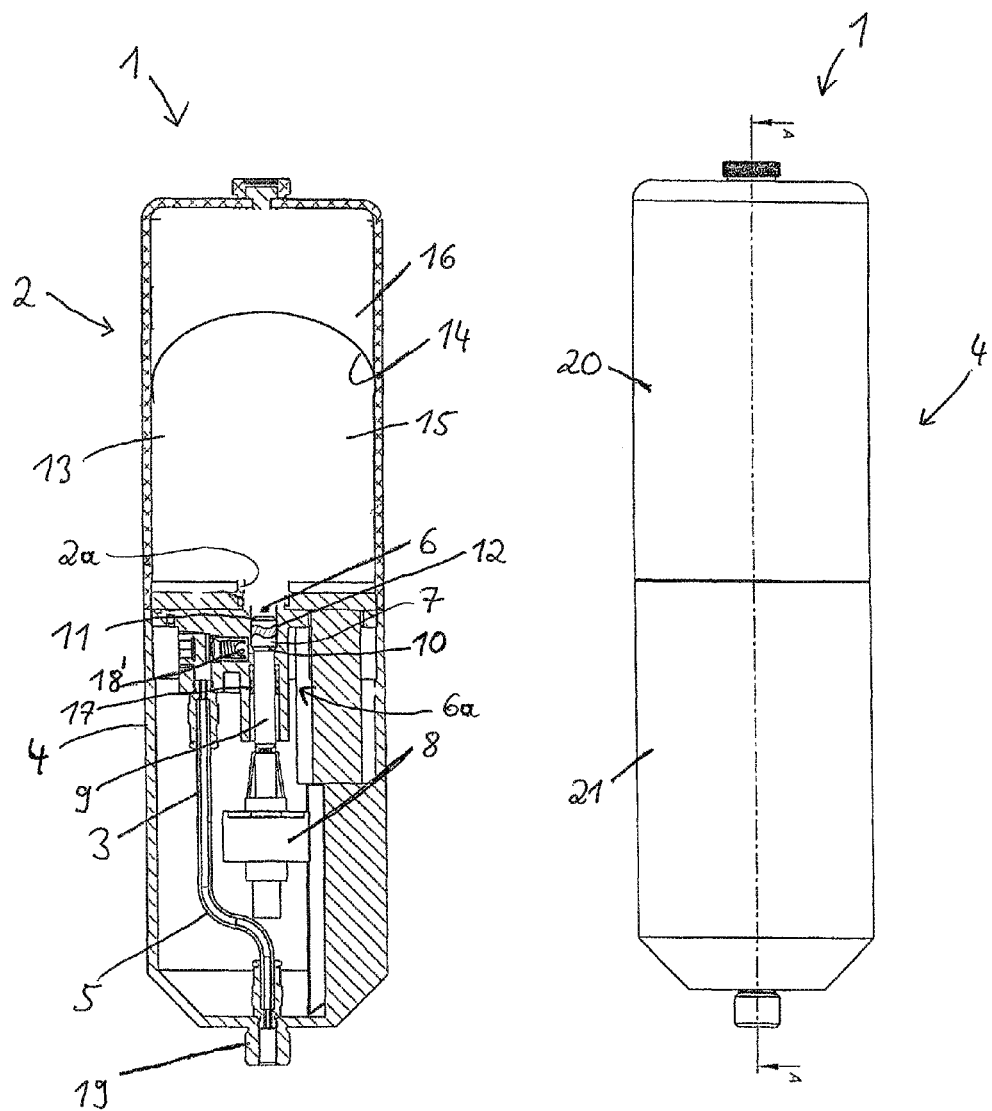
FIG. 1, a longitudinal section through a first embodiment of a lubricant dispenser.
Figure 1A:
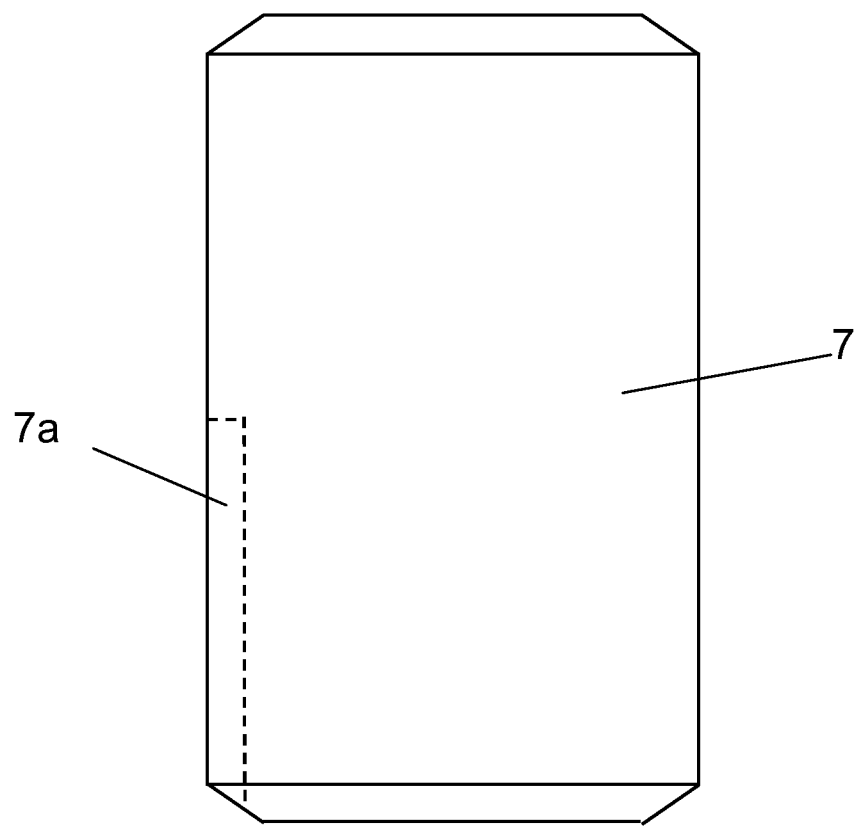
FIG. 1A is a view of an embodiment of a bypass section,
FIG. 2, an exterior view of the first embodiment,
FIG. 3, a longitudinal section through a second embodiment of a lubricant dispenser, and
FIG. 4, a lubricant dispenser with distributing element.

The lubricant dispenser 1 illustrated in FIG. 1 comprises a reservoir 2, a reservoir outlet 2a, a dispenser outlet 19, and a connecting conduit 3 that are arranged in a two-part housing 4. A pump element 6a arranged between an outlet channel 5 and the reservoir 2 features a cylinder 6, in which a piston 7 is displaceably guided. The displacement is realized with the aid of a stepping motor 8 that drives the piston 7 via a piston rod 9. In a not-shown intake position of the piston 7, a lower edge 10 of the piston 7 passes over an upper edge 11 of a cylindrical sleeve 12 such that a fluidic connection between the reservoir 2 and the cylinder 6 is produced. Lubricant is drawn into the cylinder 6 due to the negative pressure in the cylinder 6. When the piston 7 is situated in a second position that is illustrated in FIG. 1 and differs from the intake position, the piston 7 at least partially displaces the lubricant 13 situated in the cylinder 6 underneath the lower edge 10 of the piston 7 in the direction of the outlet channel 5 or the connecting conduit 3, respectively.

The reservoir is provided with a membrane 14 that separates a region 15 filled with lubricant 13 from an empty region 16. This membrane 14 can be deformed by the air pressure such that the filled region becomes smaller and smaller as the lubricant is depleted.

The cylinder 6 is sealed relative to the piston rod 9 by means of a corresponding seal 17. Furthermore, a check valve 18' provided for sealing purposes blocks a lubricant flow opposite to the direction of the outlet 19. This seal ensures that a negative pressure is generated below the lower edge 10 of the piston 7 when the piston 7 is displaced in the cylinder 6. If applicable, the check valve 18' may also be omitted as long as the lubricant 13 has a suitable viscosity for preventing said lubricant from being drawn back into the cylinder 6 from the connecting conduit 3 due to a sufficiently high friction of the lubricant 13.

The two housing parts 20, 21 of the two-part lubricant dispenser housing 4 are illustrated in the exterior view of the first embodiment of the lubricant dispenser according to FIG. 2. The first housing part 20 is assigned to the reservoir in this case. This allows a simple modular replacement of the reservoir with a new filled reservoir after its depletion.

Figure 3:
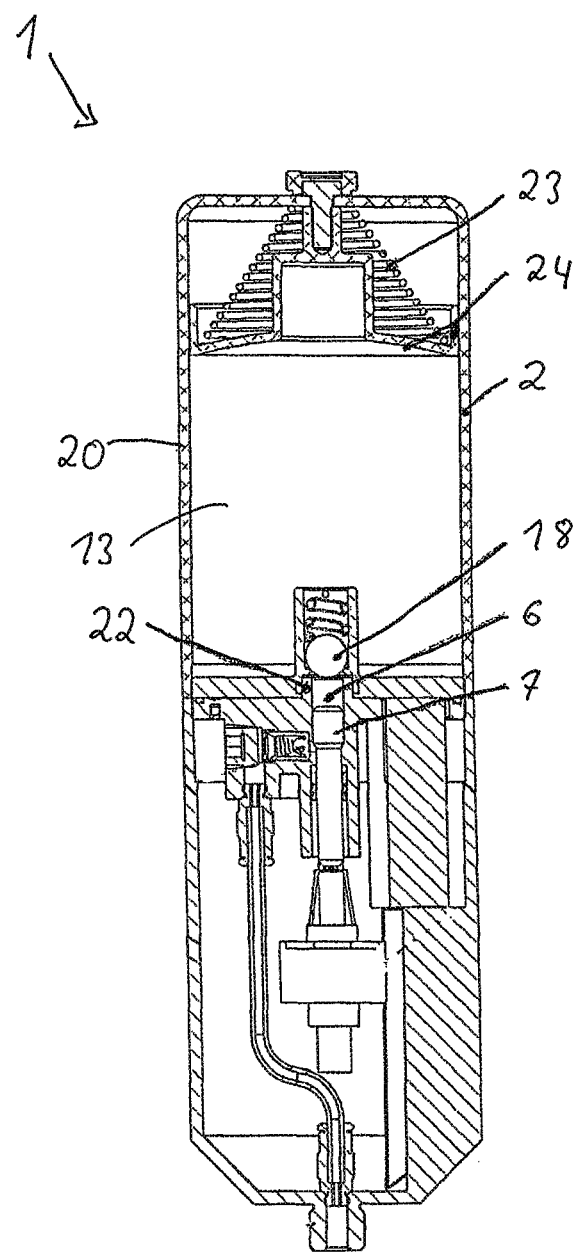

The second embodiment of the lubricant dispenser illustrated in FIG. 3 largely correspond to the first embodiment of the lubricant dispenser 1 illustrated in FIG. 1, but a check valve 18 that blocks a lubricant flow in the outlet direction of the reservoir 2 is arranged between the reservoir 2 and the cylinder 6. This check valve 18 can be opened when the piston 7 is displaced into its intake position within the intake displacement range 22. This once again makes it possible to produce a fluidic connection between the reservoir 2 and the cylinder 6.

The check valve 18 is arranged in the first housing part 20 of the reservoir 2. This makes it possible to detach and separate the reservoir 2 from the lubricant dispenser 1 without leaking any lubricant 13.

The second embodiment of the lubricant dispenser 1 is furthermore provided with a spring element 23 that subjects a pressure piston 24 to a spring force such that a pressure acts upon the lubricant 13 in the reservoir 2. This makes it possible to achieve improved dispensing characteristics of the lubricant 13 from the reservoir 2, particularly with respect to highly viscous lubricants.

Figure 4:
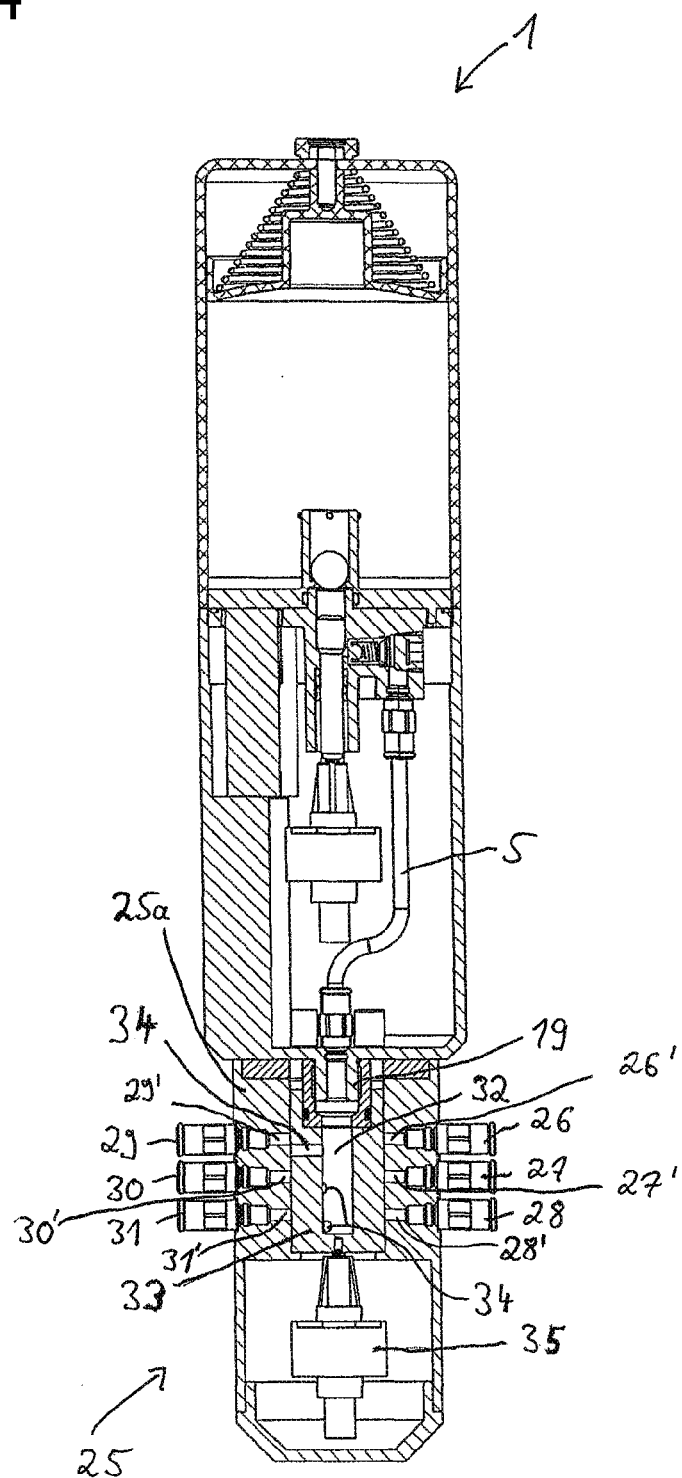

The lubricant dispenser with the distributing element 25 illustrated in FIG. 4 essentially corresponds to the second embodiment illustrated in FIG. 3. The distributing element 25 is arranged at an outlet 19 of the lubricant dispenser 1. This distributing element features different connections 26 to 31 on a distributing sleeve 25a provided for supplying different not-shown subconduits. These connections 26 to 31 are assigned to corresponding connection openings 26' to 31'. An outlet channel 5 of the lubricant dispenser 1 leads into an interior 32 of a cylindrical sleeve 33 that features several radial distribution bores 34, three of which are visible in the figure. The cylindrical sleeve 33 is provided as a control element, wherein at least one of the connection openings 26' to 31' can be arranged congruently with at least one of the radial distribution bores 34 in one rotational position. A second stepping motor 35 is provided for driving the cylindrical sleeve 33.

LIST OF REFERENCE SYMBOLS

1 Lubricant dispenser
2 Reservoir
3 Connecting conduit
4 Housing
5 Outlet channel
6 Cylinder
6a Pump element
7 Piston
8 Stepping motor
9 Piston rod
10 Lower edge
11 Upper edge
12 Cylindrical sleeve
13 Lubricant
14 Membrane
15 Filled region
16 Empty region
17 Seal
18 Check valve
19 Outlet
20 First housing part
21 Second housing part
22 Intake displacement range
23 Spring element
24 Pressure piston
25 Distributing element
25a Distributing sleeve
26 to 31 Connections
26' to 31' Connection openings
32 Interior (of cylindrical sleeve)
33 Cylindrical sleeve/control element
34 Distribution bore
35 Second stepping motor

The invention claimed is:

1. A lubricant dispenser comprising, a lubricant reservoir, a reservoir outlet, and an outlet channel for delivering lubricant to a dispenser outlet, as well as a pump element for conveying lubricant that is arranged between the reservoir and the outlet channel and features a piston that is sealed and guided in a cylinder such that it can be displaced upwardly and downwardly between two positions, with the cylinder being fluidically connected to the reservoir in an intake position, and with a cross-sectional surface of the piston being smaller than a cross-sectional surface of the reservoir, wherein the piston and the cylinder are adapted to one another in such a way that a negative pressure in comparison with the pressure in the reservoir can be generated in the cylinder during an upward movement of the piston toward the reservoir outlet into its intake position in order to draw or admit lubricant from the reservoir into the cylinder, and wherein a positive pressure can be generated in the cylinder during an opposite downward movement of the piston away from the reservoir outlet and out of its intake position in order to convey lubricant from the cylinder into the outlet channel.

2. The lubricant dispenser according to claim 1, characterized by the fact that a check valve is provided between the cylinder and the reservoir and prestressed into its closed position, in which it blocks a flow out of the reservoir.

3. The lubricant dispenser according to claim 2, characterized by the fact that the check valve can be opened by the piston at least in its intake position.

4. The lubricant dispenser according to claim 1, characterized by the fact that a check valve is provided between the cylinder and the outlet channel and can be opened by the positive pressure generated in the cylinder during a movement of the piston out of its intake position.

5. The lubricant dispenser according to claim 1, characterized by the fact that the cylinder features a bypass section, in which the piston is situated in its intake position, wherein the bypass section is realized in such a way that lubricant can flow past the piston from the side of the piston that faces the reservoir to its side that faces the outlet channel in the intake position of the piston.

6. The lubricant dispenser according to claim 1, characterized by the fact that the piston is realized in the form of a thickened section of a piston rod.

7. The lubricant dispenser according to claim 1, characterized by the fact that a stepping motor is assigned to and drives the piston.

8. The lubricant dispenser according to claim 7, characterized by the fact that the stepping motor comprises an axially displaceable drive axle, wherein the stepping motor is arranged in such a way that the direction of displacement of the drive axle extends parallel to and in alignment with the moving direction of the piston.

9. The lubricant dispenser according to claims 6 or 8, characterized by the fact that the drive axle is positively and/or non-positively connected to the piston rod.

10. The lubricant dispenser according to claim 1, characterized by the fact that the lubricant in the reservoir is subjected to pressure by at least one spring element, particularly a spring-loaded pressure piston.

11. The lubricant dispenser according to claim 1, characterized by the fact that the pressure of the lubricant at the dispenser outlet amounts to more than 5 bar, during a movement of the piston out of its intake position.

12. The lubricant dispenser according to claim 11, characterized by the fact that the pressure of the lubricant at the dispenser outlet amounts to more than 10 bar during a movement of the piston out of its intake position.

13. The lubricant dispenser according to claim 11, characterized by the fact that the pressure of the lubricant at the dispenser outlet amounts to more than 50 bar during a movement of the piston out of its intake position.

14. The lubricant dispenser according to claim 1, characterized by the fact that at least one distributing element is provided and can be connected to the outlet channel in order to distribute the lubricant over at least two subconduits, and by the fact that the distributing element features at least one control element for opening and closing at least one of the subconduits, wherein a stepping motor is assigned to and drives the control element.

15. The lubricant dispenser according to claim 14, characterized by the fact that the distributing element features a cylindrical distributing sleeve with circumferentially arranged connection openings for connecting the subconduits, as well as the control element that is realized in the form of a hollow cylindrical sleeve and accommodated in the distributing sleeve in a rotatably supported and sealed fashion, wherein the interior of the hollow control element is fluidically connected to the outlet channel, and wherein distribution bores are circumferentially arranged in the control element in such a way that at least one distribution bore can be connected to at least one of the connection openings in dependence on the relative rotational position of the control element in the distributing sleeve in order to produce a fluidic connection between the outlet channel and one of the subconduits.

16. The lubricant dispenser according to claim 15, characterized by the fact that the distribution bores are arranged relative to the connection openings in such a way that a fluidic connection between a distribution bore and one of the connection openings results in the remaining distribution bores not being fluidically connected to one of the connection openings.

17. The lubricant dispenser according to one of claims 14-16, characterized by the fact that the distributing element is accommodated in a separate housing that can be connected to a housing of the lubricant dispenser that accommodates the reservoir and/or the cylinder with the piston.

* * * * *